(12) United States Patent
Kurata

(10) Patent No.: US 6,710,320 B2
(45) Date of Patent: Mar. 23, 2004

(54) SMALL SIZED IMAGING DEVICE WHICH DETECTS POSITION INFORMATION AND IMAGE INFORMATION

(75) Inventor: Shunsuke Kurata, Kamiina-gun (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/137,889

(22) Filed: May 2, 2002

(65) Prior Publication Data

US 2002/0153473 A1 Oct. 24, 2002

Related U.S. Application Data

(63) Continuation of application No. PCT/JP01/08063, filed on Sep. 17, 2001.

(30) Foreign Application Priority Data

Sep. 18, 2000 (JP) .......................................... 2000-282703

(51) Int. Cl.[7] .............................. H01L 27/00; H04N 7/18
(52) U.S. Cl. ..................... 250/208.1; 250/216; 250/239; 348/126
(58) Field of Search .......................... 250/208.1, 559.45, 250/559.46, 559.29, 559.3, 239, 216, 330, 341.8; 348/126

(56) References Cited

U.S. PATENT DOCUMENTS

| | | | | |
|---|---|---|---|---|
| 4,682,030 A | * | 7/1987 | Rose et al. | 250/338 |
| 4,739,159 A | * | 4/1988 | Inokuchi | 250/216 |
| 5,424,838 A | * | 6/1995 | Siu | 250/559.4 |
| 5,448,649 A | * | 9/1995 | Chen et al. | 382/126 |
| 5,506,694 A | * | 4/1996 | Isobe | 358/472 |
| 5,777,321 A | * | 7/1998 | Kerschner et al. | 250/235 |
| 5,929,436 A | * | 7/1999 | Baba et al. | 250/234 |
| 6,175,107 B1 | * | 1/2001 | Juvinall | 250/223 B |

FOREIGN PATENT DOCUMENTS

| | | |
|---|---|---|
| EP | 1 001 249 A1 | 5/2000 |
| JP | 3-226618 A | 10/1991 |
| JP | 11-63913 A | 3/1999 |
| JP | 11-243129 | 9/1999 |
| JP | 2000-136916 | 5/2000 |

* cited by examiner

Primary Examiner—Stephone B. Allen
(74) Attorney, Agent, or Firm—Frishauf, Holtz, Goodman & Chick, P.C.

(57) ABSTRACT

An imaging device is provided which includes an LED, a telecentric lens which collimates LED light and converts light reflected by an object, a half mirror which reflects the LED light toward the telecentric lens and allows transmission of the reflected light converged by the telecentric lens, a diaphragm, and a two-dimensional imaging element.

9 Claims, 5 Drawing Sheets

SMALL SIZED IMAGING DEVICE WHICH DETECTS POSITION INFORMATION AND IMAGE INFORMATION

CROSS-REFERENCE TO RELATED APPLICATIONS

This is a Continuation Application of PCT Application No. PCT/JP01/08063, filed Sep. 17, 2001, which was not published under PCT Article 21(2) in English.

This application is based upon and claims the benefit of priority from the prior Japanese Patent Application No. 2000-282703, filed Sep. 16, 2000, the entire contents of which are incorporated herein by reference.

BACKGROUND OF THE INVENTION

1. Field of the Invention

The present invention relates to a small-sized imaging device which detects position information and image information.

2. Description of the Related Art

A substrate inspection apparatus inspects the surface of a semiconductor wafer and detects a defect if present.

The defect is specifically a scratch, a chipped portion, an uneven surface portion, a stain, or dust.

The substrate inspection apparatus performs two kinds of inspection: macro inspection wherein the semiconductor wafer is visually observed, and micro inspection wherein the surface of the semiconductor wafer is inspected by examining the surface in an enlarged scale by use of a microscope.

The substrate inspection apparatus includes a wafer carrier in which a plurality of semiconductor wafers are housed, an inspection section which performs the macro inspection and micro inspection, and a loader section which takes a semiconductor wafer out of the wafer carrier and delivers it to the inspection section and which receives an inspected semiconductor wafer from the inspection section and returns it to the wafer carrier.

Upon reception of a semiconductor wafer from the loader section, the inspection section first performs either macro inspection or micro inspection with respect to the semiconductor wafer.

It should be noted, however, that uninspected semiconductor wafers stored in the wafer carrier are not aligned with one another. In other words, the loader section takes them out as they are, and delivers them to the inspection section. As a result, the centers of the semiconductor wafers received by the inspection section are shifted from one another.

Normally, the semiconductor wafers are centered before they are delivered to the inspection section.

A non-contact sensor, such as that disclosed in Jpn. Pat. Appln. KOKAI Publication No. 11-243129, is used for centering the semiconductor wafers. The non-contact sensor includes a light-emitting section and a light-receiving section between which a semiconductor wafer is inserted. This type of sensor is used because it does not damage the semiconductor wafer or generate dust.

In a photolithography step included in the manufacturing process of semiconductor devices, the surface of a semiconductor wafer is examined to detect a defect, such as a scratch, a crack, a stain, or an uneven surface portion. In recent years, it is important to detect if dust attaches to an edge portion of a semiconductor wafer, if a crack is present, and the state of the width of a cut (i.e., removed portion) in a photoresist is, because the detection of these is a significant measurement item in terms of the prevention of a defect in the subsequent steps.

In the inspection of the edge of a semiconductor wafer, a light source used for illuminating a wafer edge portion and a video camera used for detecting a defect at the edge portion are arranged at positions away from each other, as disclosed in Jpn. Pat. Appln. KOKAI No. 2000-136916.

The aforesaid non-contact sensor and image sensor for the edge portion detection are provided inside the substrate inspection apparatus. Therefore, they must satisfy the requirements, such as a reduction in size, a small installation space and a low-manufacturing cost.

BRIEF SUMMARY OF THE INVENTION

Accordingly, an object of the present invention is to provide an imaging device which is small in size, can be installed in a small space, is compact, and can be manufactured at low cost.

The present invention provides an imaging device comprising: an LED light source which emits a laser beam; an optical path-splitting element located on an axis of light emitted from the LED light source; a collimate lens located on one of optical paths of the optical path-splitting element and collimating the laser beam output from the LED light source; and a two-dimensional imaging element located on another one of the optical paths and performing an image-pickup operation with respect to the reflected light guided from the collimate lens and converged by the collimate lens.

The imaging device of the above configuration is small in size, requires a small installation area, is compact and can be manufactured at low cost.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

The first embodiment of the present invention will now be described with reference to the accompanying drawings.

Figure 1:
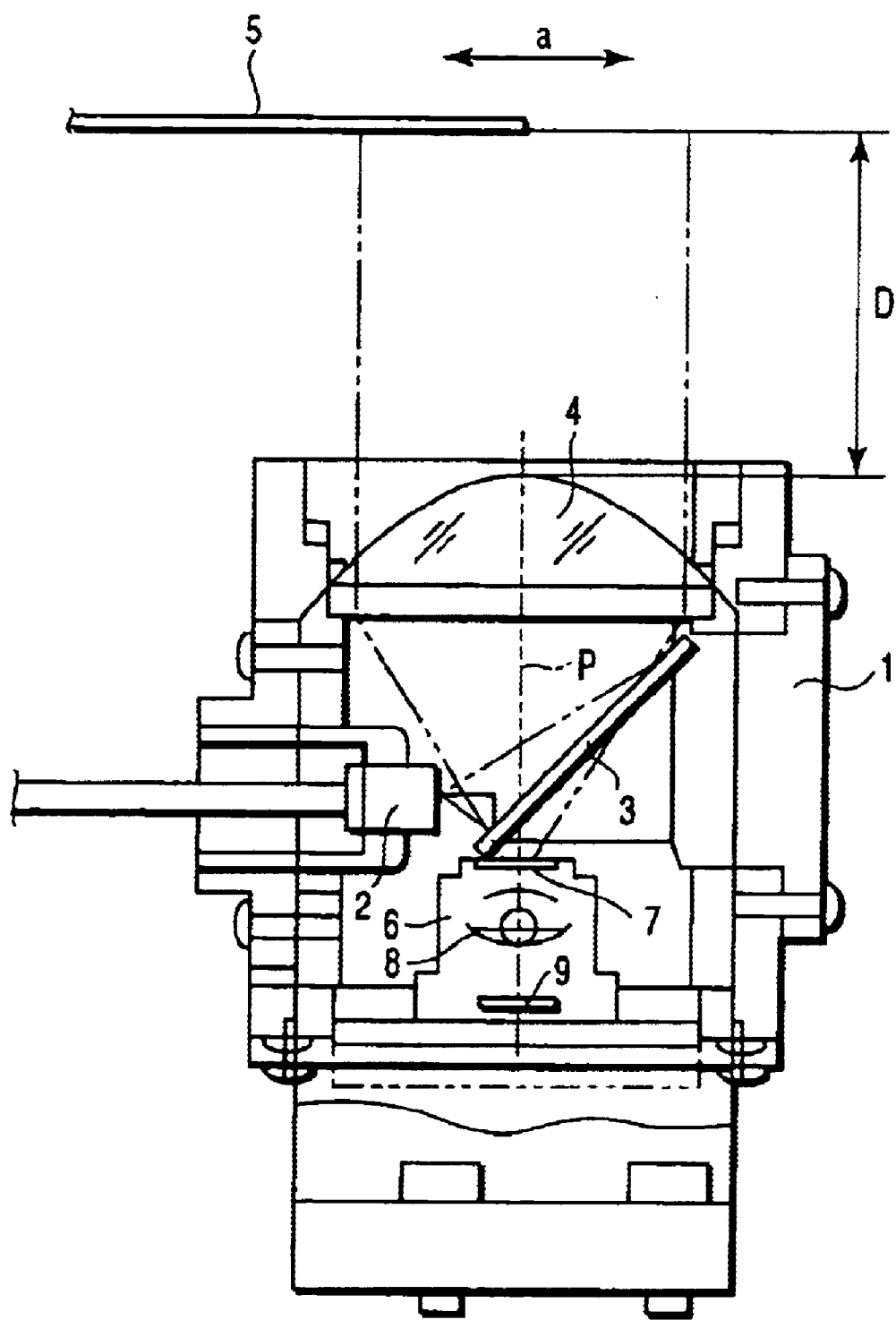
FIG. 1 is a structural diagram showing the first embodiment of an imaging device according to the present invention.

FIG. 1 is a structural diagram showing the first embodiment of an imaging device. The imaging device employs an incident-light telecentric illuminating image-formation optical system. The casing 1 of the sensor is cylindrical.

The light source is a light-emitting diode (LED) 2. The LED 2 emits LED light. The LED 2 is provided on the side wall of the sensor casing 1.

A half mirror 3 is provided inside the sensor casing 1 in an inclined state. The half mirror 3 is located in the optical path of the LED light emitted by the LED 2 and on the optical axis P extending through the interior of the sensor casing 1. The half mirror 3 is at an angle of 45 to the optical axis P, and the center of the half mirror 3 is shifted from the optical axis P.

The half mirror 3 is an optical path-splitting element. It reflects the LED beam emitted from the LED 2 in such a manner that the reflected beam is guided toward a telecentric lens 4, and also allows transmission of the reflected light reflected by an object and converged by the telecentric lens 4.

The half mirror 3 can be replaced with a beam splitter, if desired.

The telecentric lens 4 is provided in the opening of the sensor casing 1, and is located close to the upper end of the half mirror 3. The telecentric lens 4 is a convex lens. The telecentric lens 4 collimates the LED light emitted from the LED 2 and converges the reflected light reflected by an object under inspection.

The telecentric lens 4 functions as both a collimate lens and a converging lens. The former is for collimating the LED light emitted from the LED 2 and guiding that collimated beam to a wafer edge portion of the object 5. The latter is for converting the LED light reflected by the object.

An image sensor section 6 is on the optical axis P and located on the rear focal point side of the telecentric lens 4. The image sensor section 6 includes a diaphragm 7, a relay imaging lens 8 and a two-dimensional imaging element 9. The imaging element 9 is located close to the lower end of the half mirror 3.

The diaphragm 7 is a telecentric diaphragm. It is located on the rear focal point side of the telecentric lens 4.

The two-dimensional imaging element 9 includes a plurality of solid-state imaging elements (CCD) arranged in a two-dimensional plane. The two-dimensional imaging element 9 is a CMOS, for example.

The two-dimensional imaging element 9 receives the LED light reflected by the wafer edge portion of the object 5 and outputs a two-dimensional image signal derived therefrom.

The relay imaging lens 8 and the two-dimensional imaging element 9 are integrally formed as one body. In other words, the two-dimensional imaging element 9 is a CMOS with which the relay imaging lens is integrally formed.

It is desirable that the position of the two-dimensional imaging element 9 align with the optical axis P.

To reduce the height of the imaging device, it is desirable that the telecentric lens 4 and the image sensor section 6 be arranged close to the upper and lower ends of the half mirror 3, respectively.

To reduce the width of the imaging device, it is desirable that the center position of the half mirror 3 be shifted from the optical axis P in the direction away from the LED 2, and that the LED 2 be provided in the vicinity of the left end of the half mirror 3, which is closer to the optical axis P than the other end.

A description will now be given of the operation of the imaging device of the above configuration.

The LED 2 emits LED light. The LED light is reflected by the half mirror 3 and collimated by the telecentric lens 4.

The collimated LED light falls on the object 5.

The reflected light from the object 5 is incident again on the telecentric lens 4. By this telecentric lens 4, the reflected light from the wafer edge portion is converged.

After being converged, the reflected light passes through the half mirror 3 and is partly shielded by the diaphragm 7. The reflected light passing through the diaphragm 7 is converged on the relay imaging lens 8, and is then incident on the two-dimensional imaging element 9.

The two-dimensional imaging element 9 receives the incident light and outputs a two-dimensional image signal.

As described above, the first embodiment comprises: the LED 2; the telecentric lens 4 which converges the reflected light from the object 5; the half mirror 3 which reflects the LED light toward the telecentric lens 4 and allows transmission of the reflected light converged by the telecentric lens 4; the diaphragm 7; and the two-dimensional imaging element 9.

In the imaging device, therefore, the LED 2, the telecentric lens 4 and the image sensor section 6 can be arranged in the vicinity of the half mirror 3. Hence, the optics are small in size, can be installed in a small space, are compact and can be manufactured at low cost.

Furthermore, the center position of the half mirror 3 can be shifted from the optical axis P in such a manner that the LED 2 is in the vicinity of the optical axis P. As a result, the imaging device has a decreased width.

In particular, the CMOS provided with a lens is advantageously small and costless, as compared to a one-dimensional imaging sensor (such as a line sensor) and other types of two-dimensional imaging sensor.

The half mirror 3 of the imaging device reflects the LED light toward the telecentric lens 4 and allows transmission of the reflected light converged by the telecentric lens 4, owing to the use of such a half mirror, the distance between the centric lens 4 and the image sensor section 6 is nearly equal to the height of the half mirror 3. Since the height of the imaging device as measured along the optical axis P can be reduced, the imaging device is small, accordingly.

The imaging device adopts an incident-light telecentric illuminating image-formation optical system wherein the LED light emitted from the LED 2 is collimated by the telecentric lens.4 and the reflected light from the object 5 is converged.

Owing to the adoption of this system, image data on the object can be accurately acquired at all times even if the distance D between the imaging device and the object 5 changes. In other words, even if the object 5 moves in the direction of arrow a shown in FIG. 1, the imaging device never fails to acquire, accurate image data on the object 5.

The image sensor section 6 extracts image data on a desired number of pixel lines from the two-dimensional image data output from the two-dimensional imaging element 9. Hence, the image sensor section 6 can be used as a line sensor that detects an edge position on a semiconductor wafer as the object 5.

The first embodiment described above can be modified as described below.

For example, the imaging device employs a light source made of an infrared LED capable of emitting infrared light and further employs an infrared-passage filter. The infrared-passage filter allows passage of infrared light. The infrared-passage filter is provided close to either the diaphragm 7 or the two-dimensional imaging element 9, and on the optical axis p.

Owing to the use of the infrared LED and infrared-passage filter, the imaging device suppresses the noise arising from visible light and enables highly-accurate measurement.

A Fresnel lens can be used as the telecentric lens. Since the Fresnel lens is thinner than the convex lens, the imaging device can be further reduced in size.

The first example in which the-present invention is used will be described with reference to the drawings.

Figure 2:
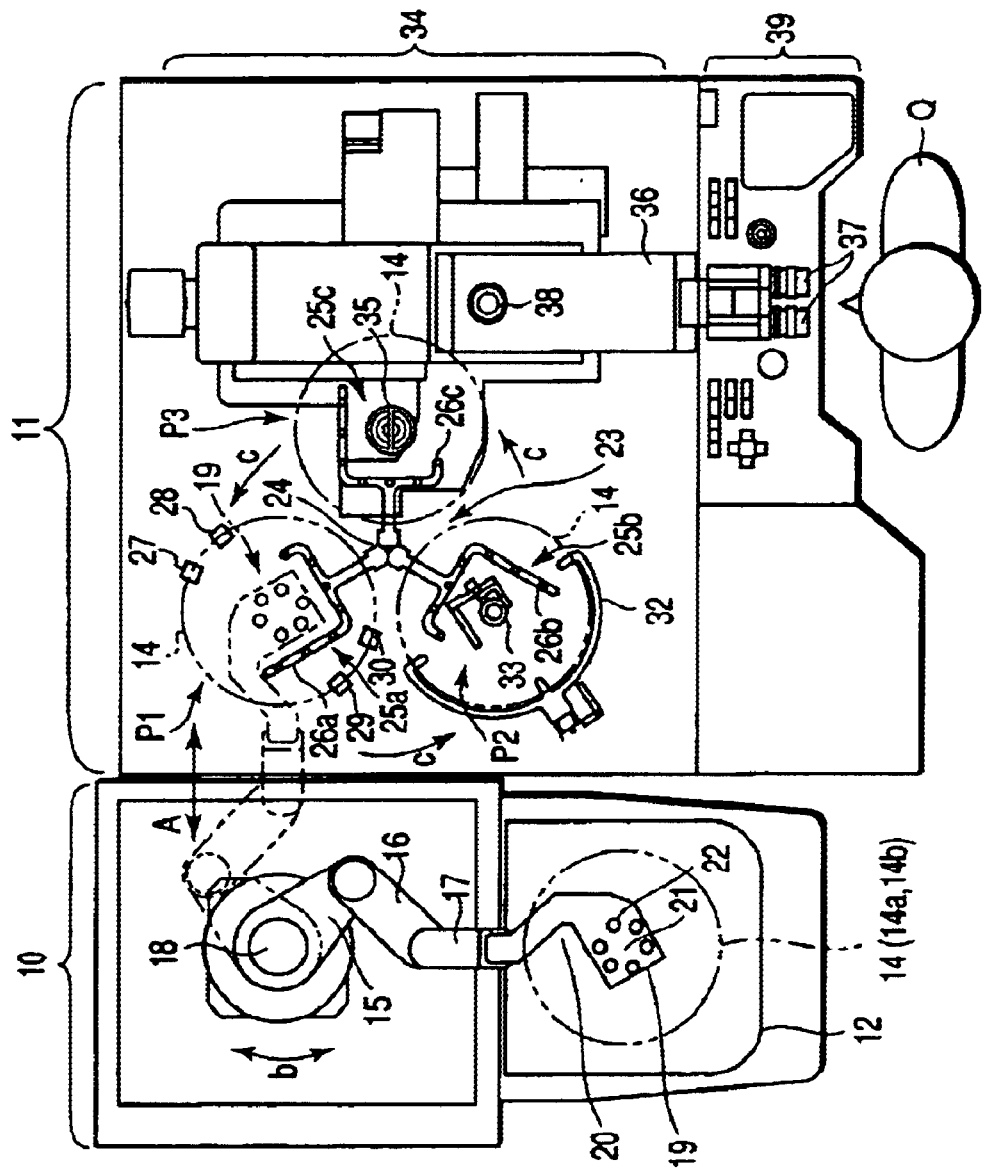
FIG. 2 is a structural diagram showing a substrate inspection apparatus and illustrating the first example of the manner in which an imaging device according to the present invention is used.

FIG. 2 is a structural diagram showing a substrate inspection apparatus to which an imaging device according to the present invention is applied. Broadly speaking, the substrate inspection apparatus is comprised of a loader section 10 and an inspection section 11.

The loader section 10 and the inspection section 11 are provided independently of each other. The loader section 10 is on the left and the inspection section on the right, when they are viewed from the front side of the apparatus.

The loader section 10 includes a wafer carrier 12 and a wafer transport robot 13. The wafer carrier 12 stores a plurality of semiconductor wafers 14 which are vertically arranged at predetermined pitches. Of the semiconductor wafers 14, those which have not yet been inspected will be referred to as "semiconductor wafers 14a" and those which have been inspected will be referred to as "semiconductor wafers 14b". The wafer transport robot 13 takes out an uninspected semiconductor wafer 14a from the wafer carrier 12 and delivers it to the inspection section 11. In addition, the wafer transport robot 13 receives an inspected semiconductor wafer 14b inspected at the inspection section 11 and stores it in the wafer carrier 12.

The wafer transport robot 13 is a multi-joint robot. It comprises a multi-joint arm which is made of three coupling arms 15–17 connected together. Of these coupling arms 15–17, the coupling arm 15 located at one end is connected to a rotating shaft 18. This rotating shaft 18 is rotated on its own axis in the direction of arrow b.

The coupling arm 17 located at the other end is connected to a hand 19. This hand 19 holds a semiconductor wafer 14 by suction. The hand 19 includes a flank portion 20 and a suction portion 21.

The suction portion 21 has a plurality of suction holes 22. These suction holes 22 are connected to a suction apparatus, such as a suction pump.

The multi-joint arm of the wafer transport robot 13 rotates in the direction of arrow a, with the rotating shaft 18 as a center of rotation. The coupling arms 15–17 are extended or retracted in such a manner as to move the hand 19 forward or backward.

To deliver or receive a semiconductor wafer 14 from the inspection section 11, the wafer transport robot 13 inserts its multi-joint arm into the inspection section 11 from the left side (in the direction of arrow E) and retracts it from the inspection section 11.

The inspection-section 11 performs macro inspection and micro inspection. In the macro inspection, the semiconductor wafer 14 is visually observed to detect a defect on the surface of the semiconductor surface. Examples of the defect-include a scratch, a chipped portion, an uneven surface portion, a stain, or dust.

In the micro inspection, the defect on the surface of the semiconductor wafer 14, which is detected in the macro inspection, is closely examined in an enlarged scale, using a microscope. By this micro inspection, the kind and size of the defect are determined.

A wafer transport device 23 is provided on the mount table of the inspection section. The wafer transport device 23 includes a rotating shaft 24 and three transport arms 25a, 25b and 25c extending from the rotating shaft 24. The transport arms 25a, 25b and 25c are away from one another at equal angular intervals (e.g., 120°).

Figure 3:
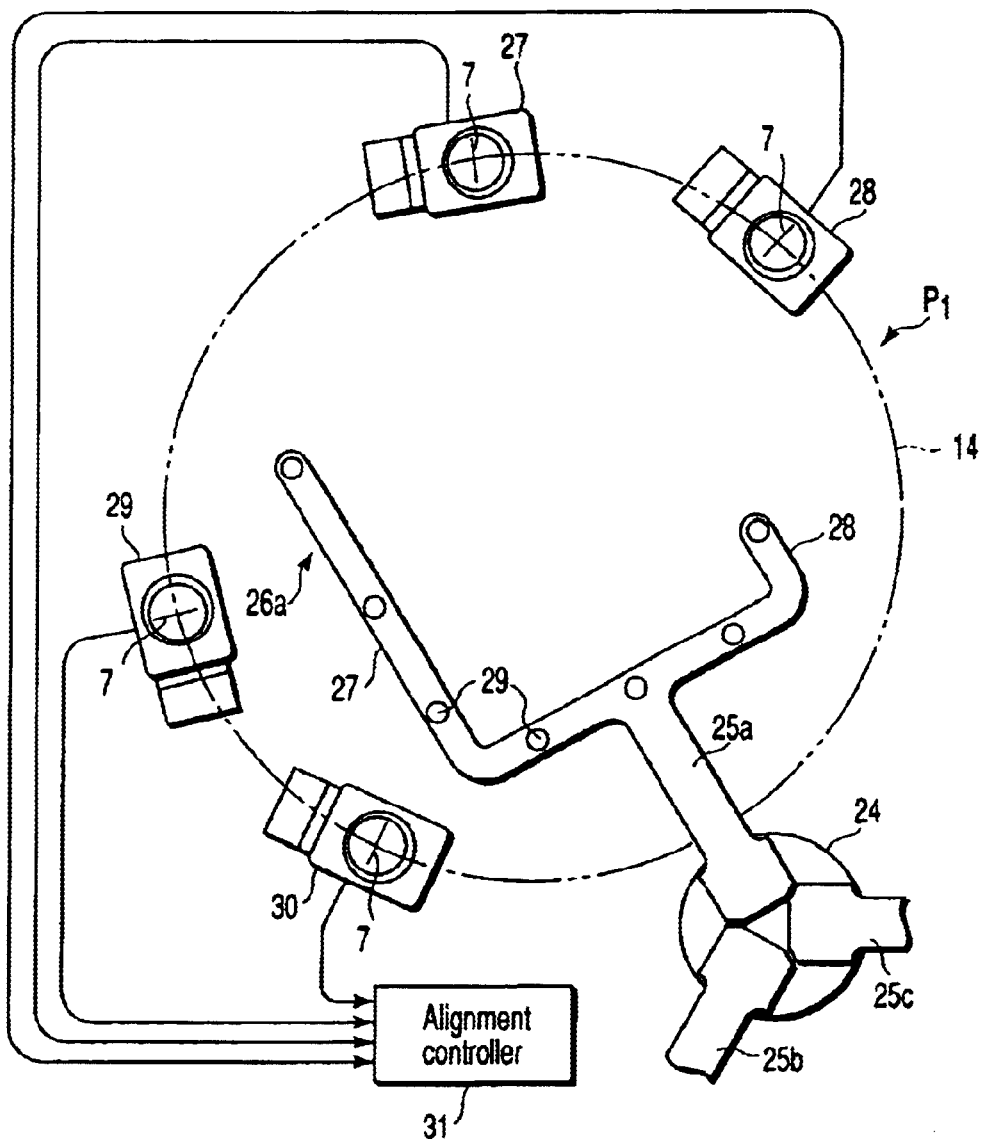
FIG. 3 is diagram showing how the imaging device is provided in the apparatus.

These transport arms 25a, 25b and 25c are L-hands 26a, 26b and 26c, each shaped like "L." Each of the L-hands 26a, 26b, 26c has a long finger 27 and a short finger 28, as shown in FIG. 3.

Each of the L-hands 27a, 27b and 27c has a plurality of suction holes (i.e., a wafer chuck). The suction holes 29 are connected to a suction apparatus, such as a suction pump.

Although only L-hand 26a is shown in FIG. 3, the other L-hands 26b and 26c are the same in structure and a description of them will be omitted.

The wafer transport device 23 is rotatable leftward as viewed in the Figure (in the direction of arrow c), with the rotating shaft 24 as a center. According, the three transport arms 25a, 25b and 25c circulate and stop at a wafer delivery position P1, a macro inspection position P2 and a micro inspection delivery position P3.

The wafer delivery position P1 is a position where a semiconductor wafer 14 is transferred between the wafer transport robot 13 and the wafer transport device 23.

One of the transport arms 25a, 25b and 25c of the wafer transport device 23 is located at the wafer delivery position P1. In FIG. 2, transport arm 25a is located at that position.

At this time, the wafer transport robot 13 operates as follows. The wafer transport robot 13 extends its multi-joint arm and inserts the hand 19 into the region inside the L-hand 26a of transport arm 25a.

The wafer transport robot 13 delivers a semiconductor wafer 14 to the L-hand 26a by moving the hand 19, on which the semiconductor wafer 14 is held, from above the L-hand 26a to the region under the L-hand 26a.

Conversely, when the semiconductor wafer 14 is moved from the L-handle 26a to the hand 19 of wafer transport robot 13, the wafer transport robot 13 moves the hand 19 from under the L-hand 26a to the region above the L-hand 26a.

The center position of the wafer delivery position P1 is within the range of the transport stroke of the wafer transport robot 13.

As shown in FIG. 3, four imaging devices 21–30 are arranged in the wafer delivery position P1.

These imaging devices 27–30 are intended for alignment of semiconductor wafers 14. The imaging devices 27–30 are located under the L-hand 26a, 26b or 26c at the wafer delivery position P1 and are fixed to the mount table of the inspection section 11.

The four imaging devices 27–30 are at positions corresponding to the outer periphery of the semiconductor wafer 14 (hereinafter referred to as a "wafer edge portion")

Preferably, the imaging devices 27–30 are arranged in such a manner that the lines connecting them form a trapezoid. Where this arrangement is adopted, the center position of the semiconductor wafer 14 can be detected accurately and reliably.

Each of these imaging devices 27–30 has the same configuration as the optical sensor described in connection with the first embodiment shown in FIG. 1. By these optical sensors 27–30, an image including the wafer edge portion of the semiconductor wafer 14 is picked up, and the two-dimensional image signal corresponding to the image is output.

When the semiconductor wafer 14 is transferred from the hand 19 to the L-hand 26a, 26b or 26c, the wafer transport robot 13 moves the multi-joint arm and hand 19 and positions the semiconductor wafer 14 in such a manner that its wafer edge portion is within the sensing ranges of all four imaging devices 27–30.

The distance between imaging devices 27 and 28 and that between imaging devices 29 and 30 are greater than the span of the orientation flats of the semiconductor wafer 14 or the width of the neck of the hand 19.

An alignment controller 31 receives two-dimensional image signals output from the imaging devices 27–30, and derives two-dimensional image data on the basis of the image signals. From the dimensional image signals output from the imaging devices 21–30, and derives two-dimensional image data on the basis of the image signals. From the two-dimensional image data, the alignment controller 31 extracts image data corresponding to one or more lines orthogonal to the wafer edge portion of the semiconductor wafer 14 (the image data will be referred to as line image data). Four detection positions (coordinates) on the wafer edge portion of the semiconductor wafer 14 are obtained on the basis of the line image data, and the center position of the semiconductor wafer 14 is obtained, using three coordinates that have nothing to do with the orientation flats or notch information.

Since the alignment controller 31 uses the two-dimensional image signals output from the two-dimensional imaging element, the detection positions of the wafer edge portion can be easily determined on the basis of the number of pixels.

The center position of the semiconductor wafer 14 can be determined in a known method for determining the central coordinates of a circle.

The alignment controller 31 compares the center position of the semiconductor wafer 14 with its original center, and calculates the amount of shift by which the center position of the semiconductor wafer 14 is shifted from the original center.

On the basis of the amount of shift, the alignment controller 31 determines an amount of correction for centering, and supplies an instruction regarding the amount of correction to the wafer transport robot 13.

On the basis of the amount of correction, the wafer transport robot 13 aligns the center of the semiconductor wafer 14 with the original center position.

A macro-inspection swinging mechanism 32 and a macro-inspection rotating mechanism 33 are located at the inspection position P2 on the mount table of the inspection section 11, as shown in FIG. 2.

The macro-inspection swinging mechanism 32 is used for the macro inspection of the surface of the semiconductor wafer 14. In this macro inspection, an examiner Q visually observes the surface of the semiconductor wafer 14.

The macro-inspection rotating mechanism 33 rotates the semiconductor wafer 14 held on the macro-inspection swinging mechanism 32 and vertically moves the semiconductor wafer 14.

A micro inspection section 34 includes a stage 35 and a microscope 36. The stage 35 holds a semiconductor wafer 14 by suction, and moves the semiconductor wafer 14.

As a result, the center position of the semiconductor wafer 14a is aligned with the original center position. In other words, the semiconductor wafer 14a is centered.

In the state where the semiconductor wafer 19 has been centered, the wafer transport robot 13 stops sucking the semiconductor wafer 14a, moves down the hand 19 that holds the semiconductor wafer 14a, and delivers the semiconductor wafer 14a to the L-hand 26a.

After being centered at the wafer-delivery position P1, the semiconductor wafer 14 is received by the three-arm wafer transport device 23 and moved to the macro inspection position P2 and the micro-inspection delivery position P3.

Macro inspection is executed at the macro inspection position P2, and micro inspection is executed at the micro inspection delivery position P3.

As described above, in the first example of use, each of the imaging devices 27–30 adopts an incident-light telecentric illuminating image-formation optical system which is intended for size reduction, less installation space and a more-compact feature, and these imaging devices are incorporated in the alignment apparatus of the substrate inspection apparatus. Owing to this, the imaging devices 27–30 can be arranged at positions under the semiconductor wafer 14a, which are free from adverse effects of a downflow.

Since each of the imaging devices 27–30 adopts an incident-light telecentric illuminating image-formation optical system, the wafer edge portion of the semiconductor wafer 14 can be detected with high accuracy even if the distance between each imaging device and the semiconductor wafer 14 varies.

Since image data corresponding to one or more lines is extracted from the two-dimensional image data output from each imaging device 27–30, the wafer edge position (coordinate data) of the semiconductor wafer 14 can be detected at high speed, and the macro inspection and micro inspection of the semiconductor wafer 14 positioned at the inspection section 11 can be executed in a short time.

The first example of use described above may be modified as follows:

As described in connection with the first embodiment, the light source of each imaging device employs an infrared LED capable of emitting infrared light, and further employs an infrared-passage filter. The infrared-passage filter allows passage of infrared light. The infrared-passage filter is provided close to either the diaphragm 7 or the two-dimensional imaging element 9, and on the optical axis p.

The use of the infrared LED and the infrared-passage filter is advantageous in that the noise arising from visible light is suppressed and highly-accurate measurement is enabled.

A description will now be given as to how the first example of use is applied.

The optical microscope 36 is provided with an XY table. This XY table is movable in an X direction and in a Y direction orthogonal to the X direction.

The XY table is provided with a rotatable stage 35, and this rotatable stage 35 has a rotating shaft in the center.

On the XY table, the rotatable stage 35 rotates, with the rotating shaft as a center. A semiconductor. wafer is placed on this rotatable stage 25.

Imaging devices according to the present invention are applicable to the optical microscope 36 comprising both the XY table and the rotatable table 35. To be more specific, the imaging devices are arranged along the wafer edge portion of the semiconductor wafer 14 on the rotatable stage 35 at predetermined intervals.

The imaging devices detect the wafer edge portion of the semiconductor wafer 14 and output a two-dimensional image signal.

Therefore, the center position of the semiconductor wafer 14 can be obtained on the basis of the two-dimensional image signals. Then, the shift amount by which the center position of the semiconductor wafer 14 is shifted from the original center position is obtained. Subsequently, the amount of correction required for eliminating the shift is obtained. Next, the XY stage is moved in accordance with the amount of correction. As a result, the decentering of the semiconductor wafer 14 is corrected.

As described above, the optical microscope 36 employing an imaging device that is small in size, compact and requires less space is advantageous in that the imaging device can be easily provided in a narrow space, such as the space between the semiconductor wafer 14 and the XY stage.

Next, the second example in which the present invention is used will be described with reference to the drawings. The structural elements similar to those shown in FIG. 1 are denoted by the same reference numerals, and a detailed description of such elements will be omitted.

Figure 4:
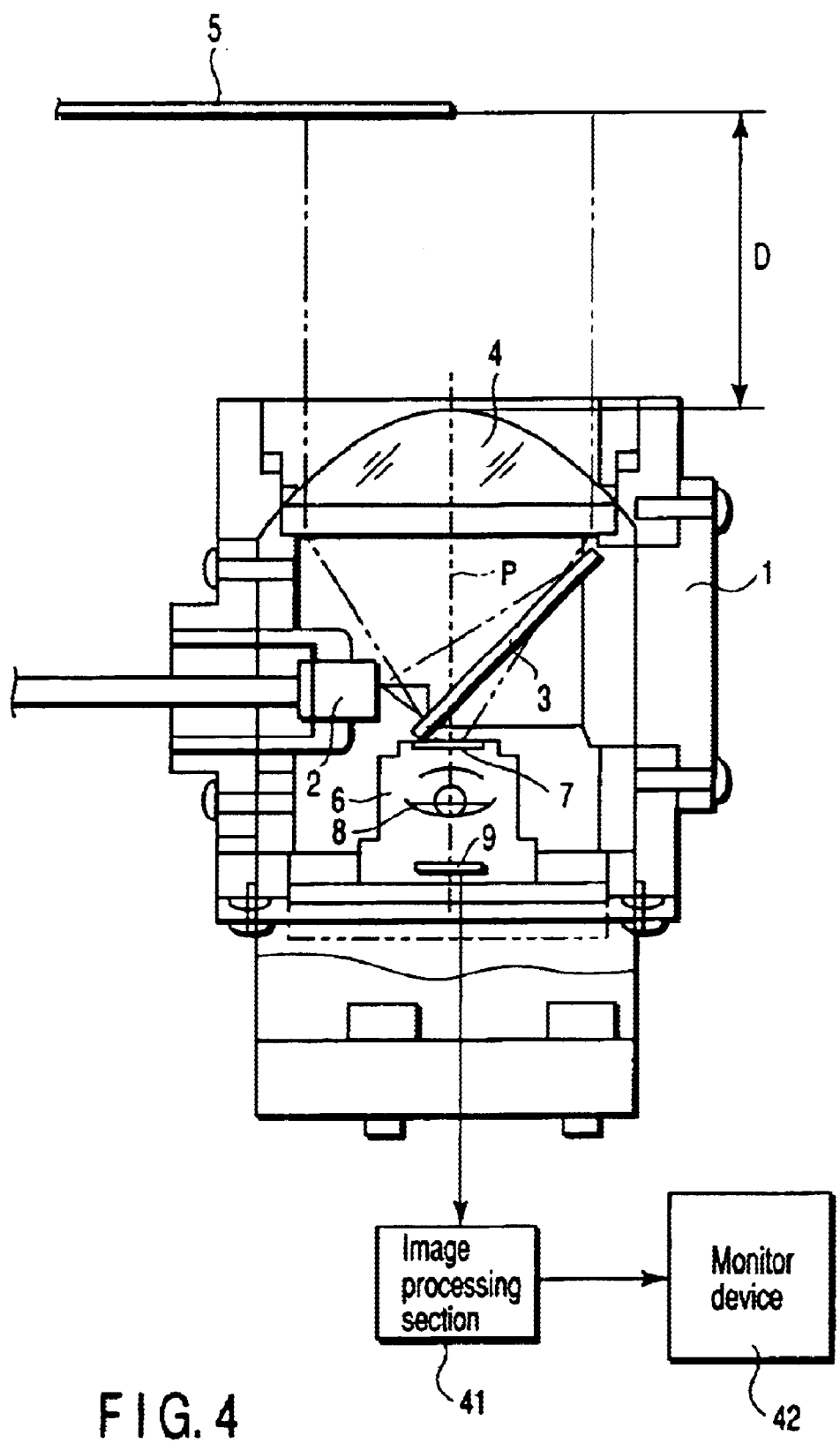
FIG. 4 is a structural diagram illustrating the second example of the manner in which an imaging device according to the present invention is used.

FIG. 4 is a structural diagram of an image processing apparatus that employs an imaging device. An image processing section 41 receives a two-dimensional image signal output from a two-dimensional imaging element, acquires two-dimensional image data of an object 5, and supplies the image data to a monitor device 42.

The image processing section 41 extracts image data corresponding to a desired pixel line number from the two-dimensional image data that have been acquired on the object 5.

For example, the imaging device of the present invention can be used as an alignment sensor for obtaining position information on the wafer edge. This is attained by applying the imaging device to the alignment apparatus of a substrate inspection apparatus. In addition, the imaging device can be used as an image sensor for acquiring image data based on which a defect (a chipped portion, a scratch, an adhered dust particle) at the wafer edge portion of the semiconductor wafer 14 is detected.

Where the four imaging devices 27–30 are arranged at the wafer delivery position PI of the substrate inspection apparatus shown in FIG. 2, they serve as alignment sensors for obtaining position information regarding the wafer edge, as described with reference to FIG. 3.

Where the imaging device 40 shown in FIG. 4 is provided at the macro inspection position P2 (shown in FIG. 2) or micro inspection position P3 of the substrate inspection apparatus incorporating a rotatable stage shown in FIG. 3, the imaging device 40 can acquire two-dimensional image data on the wafer edge portion of the semiconductor wafer 14.

The imaging device 40 is disposed above the semiconductor wafer 14 and located at a position which is close to the outer circumference of the semiconductor wafer 14 held on the macro-inspection rotating mechanism (rotatable stage) 33 shown in FIG. 2.

The two-dimensional image data is output or displayed on the monitor device 42.

Figure 5:
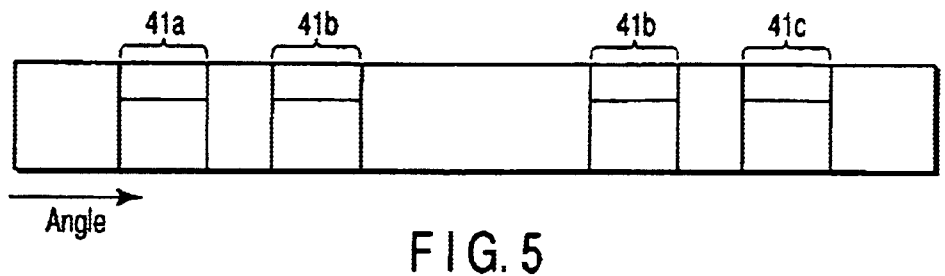
FIG. 5 is a schematic diagram of two-dimensional image data acquired by the imaging device.
Figure 6:
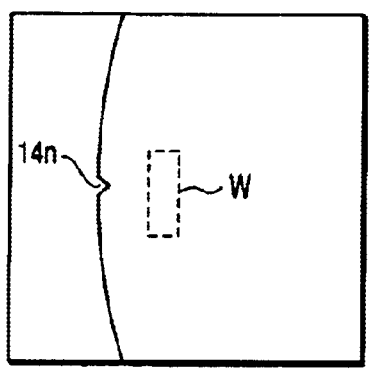
FIG. 6 shows ID information attached to a semiconductor wafer.
Figure 7:
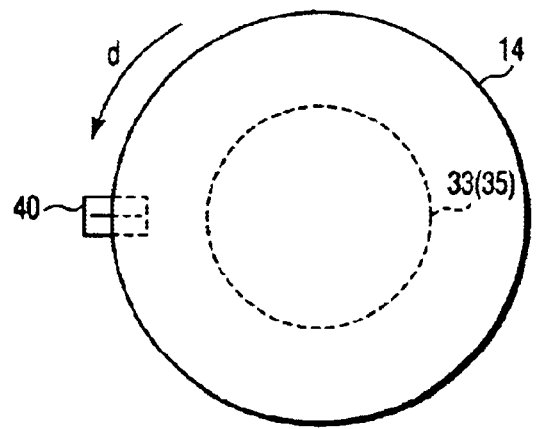
FIG. 7 illustrates how the imaging device according to the present invention is applied.

FIG. 5 shows two-dimensional image data acquired by the imaging device 40. The image data 41a–41d represent spot images corresponding to four positions and acquired by rotating the rotatable stage 33 by a predetermined angle each time.

The central coordinate data corresponding to the image data 41a-41d are obtained on the basis of angular positions of the rotatable table 33. Preferably, the angular positions are determined, using the position of an orientation flat or a notch as a standard.

To obtain the position of the orientation flat or notch, image data which is derived from the two-dimensional image data acquired by the imaging device 40 and which corresponds to one or more lines, is used as edge information data. Based on the relationships between the angle of rotation of the semiconductor wafer 14 and the edge position information, a position corresponding to a large change in the edge position information is detected, and the position of the orientation flat or notch is determined based on the detected position.

The image data 41a-41d can be displayed on the monitor device 41 as spot images. By showing a defect position in the center of the field of vision (i.e., the X axis), the defect position can be determined in relation to the position of rotation of the semiconductor wafer 14.

A defect at the wafer edge portion of the semiconductor wafer 14 can be detected when the spot image of the wafer edge portion is displayed. The defect is a chipped portion, a scratch, an adhered dust particle or the like.

A description will now be given of another modification.

A semiconductor wafer 14 is placed on the rotatable table 33(35). This rotatable table 33 rotates at a constant speed in the direction of arrow F.

At least one imaging device 40 is provided at the position corresponding to the wafer edge portion of the semiconductor wafer 14.

The imaging device 40 picks up image data contained in the acquired two-dimensional image data and corresponding to one line or a plurality of lines. This means that the imaging device 40 is used as a line CCD camera.

When the semiconductor wafer 14 is rotating, the imaging device 40 performs an imaging operation at timings synchronous with the rotation of the rotatable table 33.

Figure 8:
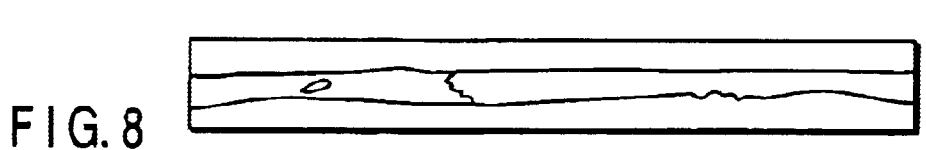
FIG. 8 is a schematic diagram of two-dimensional image data acquired by an imaging device of the present invention.

As a result, two-dimensional image data regarding all the circumference of the wafer edge portion of the semiconductor wafer 14, such as that shown in FIG. 8, is acquired.

The image represented by the two-dimensional image data are displayed on the monitor device 42. By so doing, a chipped portion, a scratch or an adhered dust particle can be detected in the wafer edge portion of the semiconductor wafer 14. In addition to these, an uneven resist portion and a resist portion flowing to the reverse side of the semiconductor wafer 14 can be detected.

Figure 9:
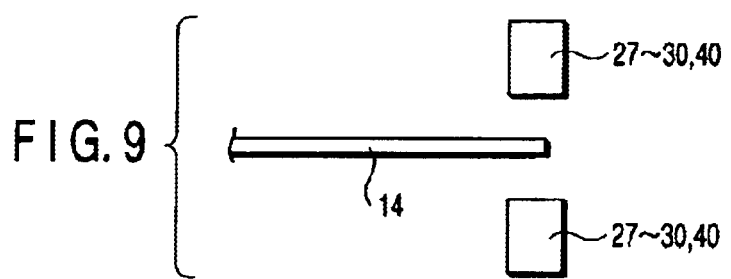
FIG. 9 shows a modification of the manner in which the imaging device according to the present invention is provided.

In the above descriptions of the first and second examples of use, reference was made to the case where the imaging devices 27–30 and 40 are arranged only on one side of the semiconductor wafer. As shown in FIG. 9, imaging devices may be arranged on both sides of the semiconductor wafer 14.

Where this structure is adopted, two-dimensional image data can be acquired with respect to both sides of the semiconductor wafer.

An imaging device according to the present invention is used in various kinds of apparatus, including an inspection apparatus for macro or micro inspection of an object, such as a semiconductor wafer, an IC manufacturing apparatus (e.g., a stepper), an apparatus for measuring a film thickness or the like. In these types of apparatus, the imaging device is used for alignment of semiconductor wafers or for acquisition of a two-dimensional image of a desired portion of an object.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
    a tubular casing having openings at respective ends and an optical axis extending in an axial direction thereof,
    an LED light source which is provided in a vicinity of a side wall of the casing and which emits light toward an internal region of the casing;
    an optical path-splitting element which is provided in an inclined manner at an intersection between an optical path of the light emitted from the LED light source and the optical axis of the casing, said optical path-splitting element reflecting the light emitted from the LED light source to cause said light to travel in a traveling direction toward an object located in a direction of the optical axis, and said optical path-splitting element also allowing transmission of reflected light which is reflected back by the object and which is incident on the optical path-splitting element from a direction opposite to the traveling direction of the light emitted from the LED light source and reflected by the optical path-splitting element;
    a lens located in one of the openings of the casing, said lens collimating the light emitted from the LED light source and reflected by the optical path-splitting element and causing the collimated light to travel toward the object, and said lens also converging the reflected light which is reflected back by the object; and
    a two-dimensional sensor section which is located in another one of the openings of the casing, and which performs an image pick-up operation with respect to the reflected light reflected back by the object, converged by the lens and transmitted through the optical path-splitting element.

2. An imaging device according to claim 1, wherein the optical axis of the optical path-splitting element defines a vertical direction, the lens is provided in a vicinity of an upper end of the optical path-splitting element, and the two-dimensional sensor section is provided in a vicinity of a lower end of the optical path-splitting element.

3. An imaging device according to claim 1, wherein the optical path-splitting element is inclined 45° with respect to the optical axis of the casing and has a center shifted from the optical axis in a direction away from the LED light source, and the LED light source is located in a lower region which is opposite to a region to which the optical path-splitting element is shifted and in which the reflected light converged by the lens does not travel.

4. An imaging device according to claim 1, wherein the LED light source is located in a vicinity of a path of the-reflected light converged by the lens.

5. An imaging device according to claim 1, wherein the lens is a telecentric lens.

6. An imaging device according to claim 1, wherein the lens is a Fresnel lens.

7. An imaging device according to claim 1, wherein the two-dimensional image sensor section comprises a CMOS and a relay imaging lens.

8. An imaging device according to claim 1, wherein:
    the two-dimensional image sensor section acquires two-dimensional image data by imaging the reflected light reflected back by the object, converged by the lens and transmitted through the optical path-splitting element; and
    wherein the imaging device further comprises an image processor section which extracts image data corresponding to at least one line from the two-dimensional image data acquired by the two-dimensional image sensor section.

9. An imaging sensor according to claim 1, wherein the LED light source is an infrared LED that emits infrared light, and the two-dimensional image sensor section includes an infrared-passage filter that allows passage of infrared components of the reflected light reflected back by the object.

* * * * *